(12) United States Patent
Tamada et al.

(10) Patent No.: US 6,405,483 B1
(45) Date of Patent: Jun. 18, 2002

(54) APPARATUS FOR OPENING AND CLOSING WORKING AREAS OF MACHINE TOOL

(75) Inventors: Naoya Tamada; Shiro Okubo, both of Nara (JP)

(73) Assignee: Mori Seiki Co., Ltd., Nara (JP)

( * ) Notice: Subject to any disclaimer, the term of this patent is extended or adjusted under 35 U.S.C. 154(b) by 0 days.

(21) Appl. No.: 09/401,083

(22) Filed: Sep. 22, 1999

(30) Foreign Application Priority Data

Sep. 29, 1998 (JP) .......................................... 10-275248

(51) Int. Cl.⁷ ............................................. E05D 15/00
(52) U.S. Cl. ........................................... 49/142; 49/143
(58) Field of Search .......................... 49/103, 366, 367, 49/254, 142, 143, 145; 312/310, 322, 323

(56) References Cited

U.S. PATENT DOCUMENTS

| | | | | |
|---|---|---|---|---|
| 1,941,969 A | * | 1/1934 | Calabrese | |
| 2,218,505 A | * | 10/1940 | Chambers | 49/103 |
| 2,249,932 A | * | 7/1941 | Beal | |
| 2,332,753 A | * | 10/1943 | Rawlings | |
| 3,311,438 A | * | 3/1967 | Barrow | |
| 3,638,762 A | * | 2/1972 | Johns | 187/52 |
| 3,879,096 A | * | 4/1975 | Blodee | 312/265 |
| 4,457,405 A | * | 7/1984 | Johns | 187/52 |
| 5,108,165 A | * | 4/1992 | Rorke et al. | 312/322 |
| 5,399,010 A | * | 3/1995 | McClung et al. | 312/334.1 |
| 5,772,292 A | * | 6/1998 | Touzani et al. | 312/208.1 |
| 5,944,399 A | * | 8/1999 | Gillispie | 312/324 |
| 6,085,542 A | * | 7/2000 | Johnson et al. | 62/441 |
| 6,095,623 A | * | 8/2000 | Goto et al. | 312/7.2 |
| 6,241,432 B1 | * | 6/2001 | Sasanecki | 408/56 |
| 6,243,006 B1 | * | 6/2001 | Rejc et al. | 340/436 |

\* cited by examiner

Primary Examiner—Curtis Cohen
(74) Attorney, Agent, or Firm—Rosenthal & Osha L.L.P.

(57) ABSTRACT

In an apparatus for opening and closing a working area of a machine tool (1) which comprises a front door (6) for opening and closing an operation opening (5a) formed in a cover (5) serving as a partition between the working area A and an operator, and a ceiling shutter (8) covering an upper part of the above working area A so as to be opened and closed, there is provided a detection switch for detecting a closed condition of the front door (6), and an interlocking mechanism (9) for blocking a closing operation of the front door (6) while the ceiling shutter is open.

5 Claims, 2 Drawing Sheets

APPARATUS FOR OPENING AND CLOSING WORKING AREAS OF MACHINE TOOL

BACKGROUND OF THE INVENTION

1. Field of the Invention

This invention relates to an apparatus for opening and closing a working area of a machine tool such as an NC lathe, and is applicable to a machine tool having two doors for opening and closing an operation opening formed in a cover to enable and inhibit the access to the working area.

2. Description of Related Art

In general, NC lathes are so constructed that a cover is provided to separate, as a partition, the working area from an operator. The cover is formed with an opening through which the operator can attach and detach a workpiece. The opening is opened and closed with a front door. Some lathes are further provided with a ceiling shutter which covers an upper part of the working area, and which can be opened to facilitate the access to a tool post or a chuck for preparation by the operator. Each of these front door and ceiling shutter is generally opened and closed manually by the operator.

In case where two doors such as the front door and the ceiling shutter are provided, detection switches are provided for respectively detecting the closed conditions of the doors, so that the lathe will not be able to work unless both the front door and the ceiling shutter are closed.

The structure having the front door and the ceiling shutter and provided with respective detection switches requires a larger number of switches and addition or modification of sequence circuits, and thus results in the increased cost as compared with the structure in which the ceiling shutter is not present.

SUMMARY OF THE INVENTION

The present invention is made in view of the above drawbacks. It is an object of the present invention to provide a cost-effective apparatus for opening and closing a working area of a machine tool, which is free from the addition of the closed condition detection switch and the need of adding or modifying the sequence circuits.

To achieve the above-noted object, the present invention provides an apparatus for opening and closing a working area of a machine tool having a cover separating the working area from an operator. The apparatus comprises two doors for opening and closing an operation opening formed in the cover, a detection switch for detecting a closed condition of either one of the doors, and an interlocking mechanism which is adapted to block a closing operation of the one door while the other door is open.

In the apparatus for opening and closing the working area of the machine tool according to the present invention, a detection switch is provided for detecting a closed condition of one of the doors, and the one of the doors is unable to be closed by the interlocking mechanism when the other door is open. Therefore, the detection of the closed condition on the one door means the detection of the closed conditions on both of the doors, and accordingly, only one detection switch is enough to detect the closed conditions of both the doors. Consequently, it is possible to obviate the necessity of adding and modifying the sequence circuits and avoiding the increase of the cost.

The present disclosure relates to the subject matter contained in Japanese patent application No. Hei. 10-275248 (filed on Sep. 29, 1998), which is expressly incorporated herein by reference in its entirety.

DESCRIPTION OF THE PREFERRED EMBODIMENT

An embodiment of the present invention will be described hereunder with reference to the accompanying drawings.

Figure 1:
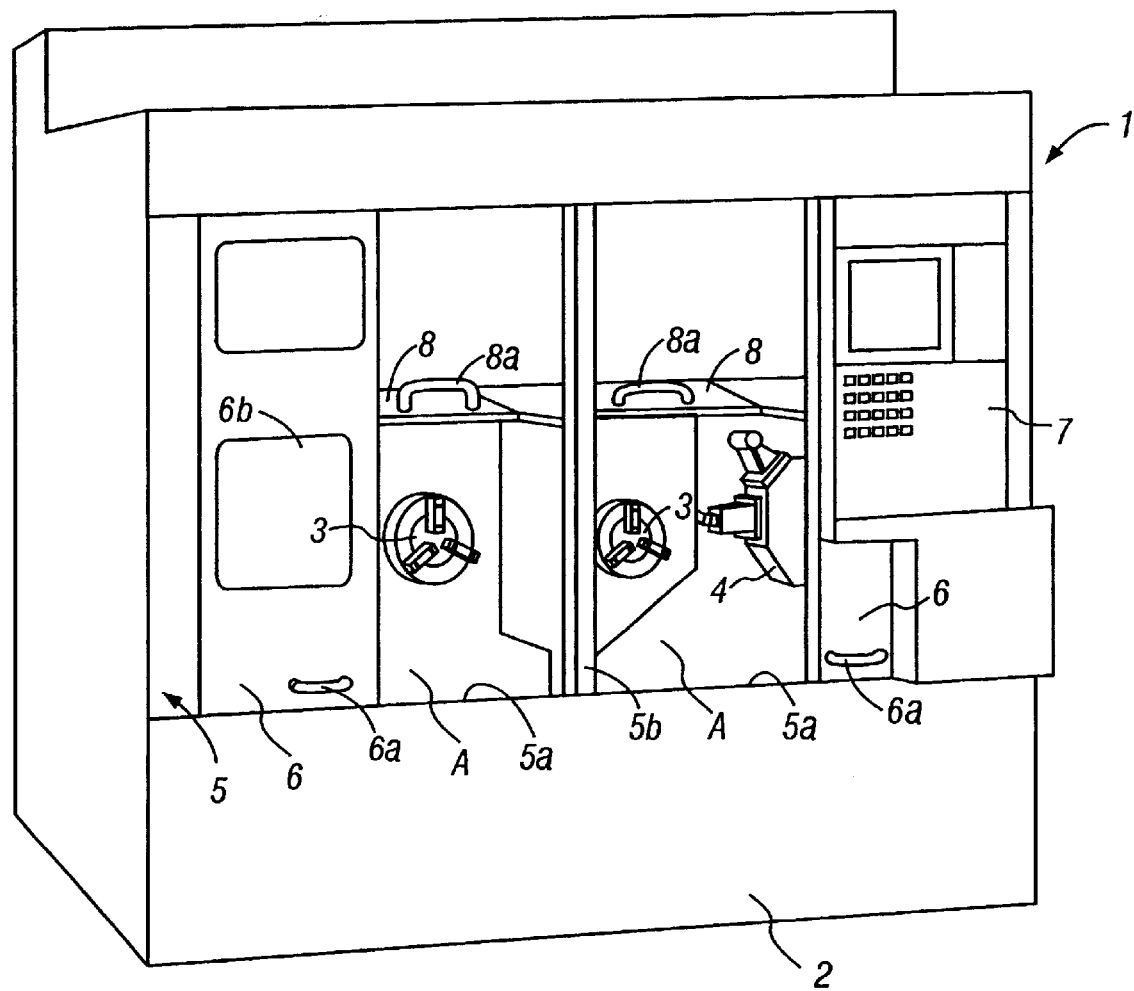
FIG. 1 is a perspective view of an NC lathe provided with an apparatus for opening and closing a working areas according to an embodiment of the present invention.
Figure 2:
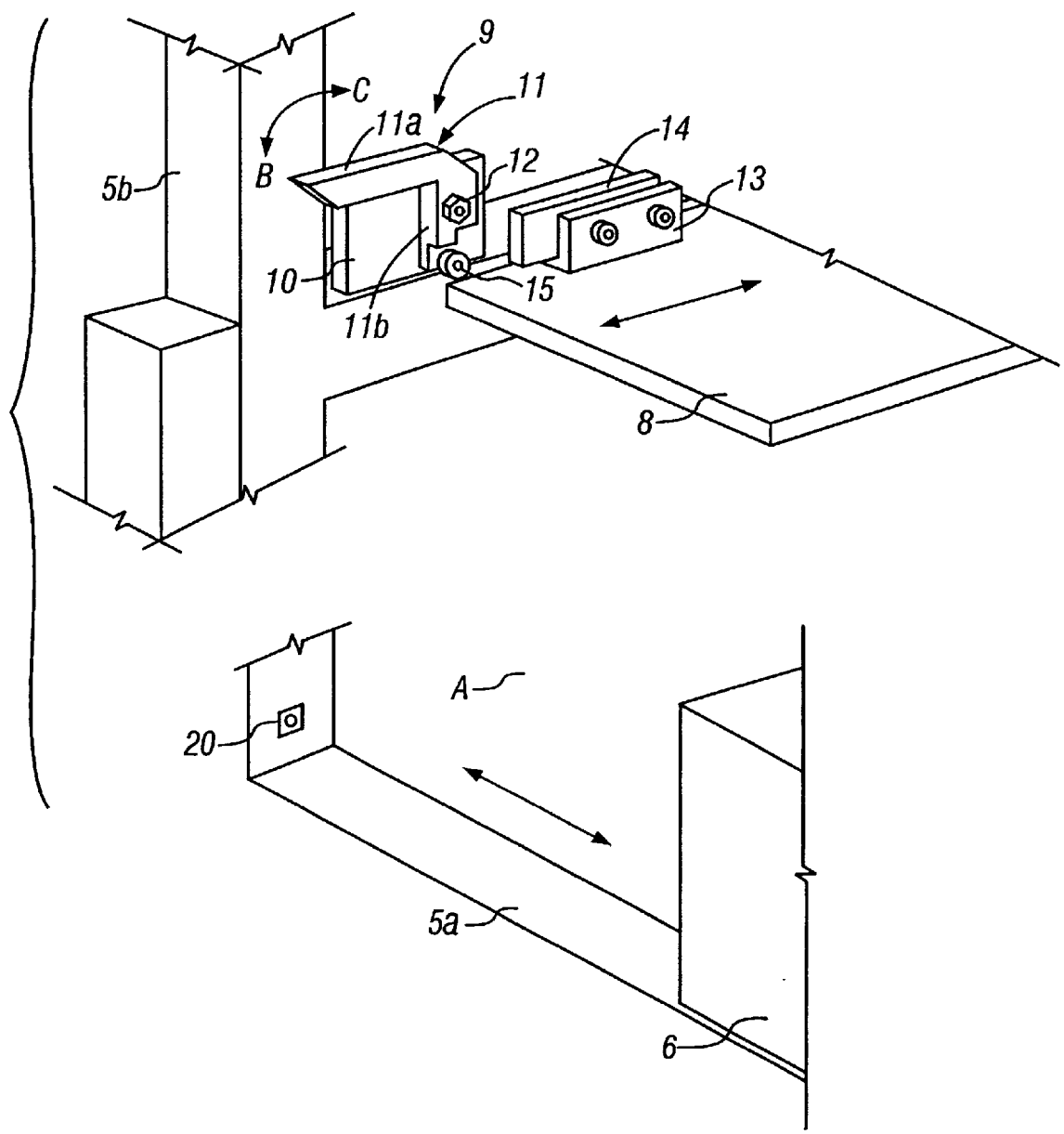
FIG. 2 is a perspective view showing a part including an interlocking mechanism in the apparatus.

FIGS. 1 and 2 shows an apparatus for opening and closing a working area of a machine tool according to an embodiment of the present invention, which is applied to an NC lathe.

In the drawings, numeral 1 designates an NC lathe. The NC lathe 1 defines a pair of left and right working areas A and A on a lathe bed 2. Each of the working areas A and A is provided with a main spindle 3 and a tool post 4, and covered with a cover 5 for separating the working area A from the operator. An upper portion of the cover 5 above each of the working areas A is opened to form an open space, through which a workpiece holding arm of a workpiece supplying and discharging mechanism can be entered into the working area A.

The cover 5 is provided for the purpose of preventing chips and lubricating oil from splashing outward. A pair of left and right operation openings 5a and 5a are formed in the cover 5 so as to correspond to the left and the right working areas A and A. Each of the operation openings 5a can be opened and closed with a front door 6 which is arranged so as to slide to the left and the right. In a central border part 5b, there is arranged a closed condition detection switch 20 for detecting the closed condition of a corresponding one of the front doors 6. Numeral 6a designates a handle with which the operator can slidingly move the front door 6 to the left and the right, and numeral 6b designates a window through which the operator can inspect the inside. Numeral 7 designates a control panel disposed in front of the right-hand area of the cover 5.

A ceiling shutter 8 is provided above each of the working area A to open and close the open upper portion of the cover 5. The ceiling shutter 8 is slidable back and forth in a horizontal direction. As shown in FIG. 2, an interlocking mechanism 9 is provided inside the central border part 5b of the cover 5 is arranged to inhibit the front door 6 from being completely closed when the ceiling shutter 8 is open.

The interlocking mechanism 9 includes a block 10 fixed inside the central border part 5b, a locking member 11 which is supported by the block 10 and rotatable about a support pin 12 between an unlocked position C and a locked position B, and a pressure plate 14 fixed to an end of the ceiling shutter 8 at a side of the central border part 5b by a bracket 13.

The locking member 11 is made up of a horizontal portion 11a and a vertical portion 11b to present an L-shape. The locking member 11 is rotatively biased to the locked position B in which a distal end of the horizontal portion 11a projects into the operation opening 5a to inhibit the complete closure of the front door 6. A cam follower 15 is rotatably mounted on a lower end of the vertical portion 11b. When the ceiling shutter 8 is slidingly moved to its closed position, the pressure plate 14 comes into contact with the cam follower 15, thereby rotating the locking member 11 to the unlocked position C in which the horizontal portion 11a is retracted from the operation opening 5a.

In the present embodiment, when the front door 6 is completely closed, the detection switch detects the completely closed condition of the front door 6, upon which the NC lathe 1 is made available to work. Meanwhile, the closed condition of the ceiling shutter 8 cannot be detected, because there is no detection switch provided for the ceiling shutter 8. However, when the ceiling shutter 8 is open, the locking member 11 of the interlocking mechanism 9 remains held at the locked position B, so that the distal end of the horizontal portion 11a of the locking member 11 is clamped between the central border part 5b and an edge of the front door 6 at the side of the central border part if the operator attempts to close the front door 6. Therefore, the closed condition of the front door 6 is not detected, and there will not occur such a problem that the operation of the lathe 1 starts in a state where the ceiling shutter 8 is left open by mistake.

When the ceiling shutter 8 is completely closed, the pressure plate 14 comes into contact with the cam follower 15 to rotate the locking member 11 into the unlocked condition C, and thus the front door 6 can be completely closed without any hindrance. The detection switch detects the closed condition of the front door 6 and then, the lathe 1 will start to work.

As described above, in the apparatus according to the present embodiment, only one switch for detecting the closed condition of the front door 6 is provided. While the ceiling shutter 8 is open, the front door 6 cannot be closed due to the presence of the interlocking mechanism 9. In other words, detection of the closed condition of only the front door 6 will result in detection of the closed conditions of both the ceiling shutter 8 and the front door 6. Therefore, only one detection switch is required, and no addition nor modification of the sequence circuits are necessary, and thus the increase of the cost can be avoided.

This embodiment has been described with reference to the case where the detection switch is provided for detecting the closed condition of the front door 6 and the interlocking mechanism 9 is provided for preventing the front door 6 from being completely closed while the ceiling shutter 8 is open. The present invention is not limited to this case, and a reverse arrangement may be employed. That is, the detection switch may be provided for detecting the closed condition of the ceiling shutter and the interlocking mechanism may be provided for preventing the ceiling shutter from being completely closed while the front door is open.

This embodiment has been described with reference to the case where the present invention is applied to an NC lathe having the front door and the ceiling shutter. However, application of this invention is not restricted to the NC lathe, but to any type of machine tools as long as they are provided with two doors for the opening.

What is claimed is:

1. An apparatus for opening and closing a working area of a machine tool having a cover separating said working area from an operator, said apparatus comprising:

a front door provided at a front of the cover for opening and closing an operation opening of the cover;

a shutter provided at a top of the cover for opening and closing a ceiling opening of the cover;

a detection switch provided at a predetermined position of the cover and connected to a sequence circuit for detecting a closed condition of the front door; and an interlocking mechanism which inhibits complete closure of the front door when the shutter remains open.

2. An apparatus for opening and closing a working area of a machine tool having a cover separating said working area from an operator, said apparatus comprising:

a front door provided at a front of the cover for opening and closing an operation opening of the cover;

a shutter provided at a top of the cover for opening and closing a ceiling opening of the cover;

a detection switch provided at a predetermined position of the cover and connected to a sequence circuit for detecting a closed condition of the front door; and an interlocking mechanism which inhibits complete closure of the front door when the shutter remains open, wherein said interlocking mechanism includes a locking member biased to project into a path along which said front door is opened and closed, and said locking member is retracted from said path when said shutter is completely closed.

3. The apparatus according to claim 2, wherein said interlocking mechanism further includes a pressure plate fixed to said shutter and a cam follower provided on said locking member, wherein said pressure plate and said cam follower cooperatively retract said locking member from said path when said shutter is completely closed.

4. An apparatus for opening and closing a working area of a machine tool having a cover separating said working area from an operator, said apparatus comprising:

a front door provided at a front of the cover for opening and closing an operation opening of the cover;

a shutter provided at a top of the cover for opening and closing a ceiling opening of the cover;

a detection switch provided at a predetermined position of the cover and connected to a sequence circuit for detecting a closed condition of the front door; and an interlocking mechanism which inhibits complete closure of the front door when the shutter remains open, wherein said interlocking mechanism includes a locking member movable between a locked position in which the front door is abatable against the locking member and a unlocked position in which the front door is free from the locking member.

5. The apparatus according to claim 4, wherein said interlocking mechanism further includes a pressure plate fixed to said shutter, said pressure plate holding the locking member in said unlocked position when said shutter is completely closed.

* * * * *